United States Patent
Nishida et al.

(10) Patent No.: US 7,819,767 B2
(45) Date of Patent: Oct. 26, 2010

(54) FRICTION TRANSMISSION BELT

(75) Inventors: Shuhei Nishida, Kobe (JP); Satoshi Shimoo, Kobe (JP); Yorifumi Hineno, Kobe (JP)

(73) Assignee: Mitsuboshi Belting Ltd., Hyogo (JP)

( * ) Notice: Subject to any disclaimer, the term of this patent is extended or adjusted under 35 U.S.C. 154(b) by 459 days.

(21) Appl. No.: 11/528,356

(22) Filed: Sep. 28, 2006

(65) Prior Publication Data
US 2007/0082777 A1 Apr. 12, 2007

(30) Foreign Application Priority Data
Sep. 30, 2005 (JP) .................. P.2005-286350
Jun. 16, 2006 (JP) .................. P.2006-167740

(51) Int. Cl.
F16G 1/00 (2006.01)
F16G 5/00 (2006.01)
F16G 9/00 (2006.01)
F16G 1/04 (2006.01)

(52) U.S. Cl. .................. 474/237; 474/238; 474/268

(58) Field of Classification Search .................. 474/260, 474/263, 237, 205
See application file for complete search history.

(56) References Cited

U.S. PATENT DOCUMENTS

| | | | | |
|---|---|---|---|---|
| 4,244,234 A | * | 1/1981 | Standley | .................. 474/263 |
| 6,391,945 B2 | * | 5/2002 | Sandstrom | .................. 524/47 |
| 2003/0050144 A1 | * | 3/2003 | Moncrief et al. | .................. 474/263 |

FOREIGN PATENT DOCUMENTS

| | | |
|---|---|---|
| JP | 9-500930 A | 1/1997 |
| JP | 11-264447 A | 9/1999 |
| JP | 2005-147392 A | 6/2005 |
| WO | 96/13544 A | 5/1996 |

OTHER PUBLICATIONS

European Search Report for EP 06 02 0579 dated Sep. 9, 2007.

* cited by examiner

*Primary Examiner*—John Q Nguyen
*Assistant Examiner*—Henry Liu
(74) *Attorney, Agent, or Firm*—Sughrue Mion, PLLC (57) ABSTRACT

The present invention provides a friction transmission belt having a friction transmission surface having a rubber composition containing a plasticizer, the plasticizer forming a film on the friction transmission surface, a change in friction coefficient ($\mu$) with respect to a change in slipping velocity (V) indicated by a difference between a pulley speed and a belt speed ($d\mu/dv$) being 0 or a positive value in a dry state and a wet state.

12 Claims, 6 Drawing Sheets

FRICTION TRANSMISSION BELT

FIELD OF THE INVENTION

The present invention relates to a frictional forced power transmission belt (hereinafter referred to as friction transmission belt) to be used for power transmission.

BACKGROUND OF THE INVENTION

A rubber such as a natural rubber, a styrene-butadiene rubber, and a chloroprene rubber has generally been used for a friction transmission belt for power transmission used for an automobile engine and the like. However, with the social needs for energy conservation and space saving in the background, there is a tendency of densely packing component parts in an engine room of an automobile, and an ambient temperature in the engine room is being increased due to the dense packing as compared to the conventional examples.

In such high temperature environment, a problem of an early crack generation that occurs due to hardening of the rubber used for the friction transmission belt has been pointed out. Also, since a revolution fluctuation of the engine has been increased along with the energy conservation, a tension fluctuation of a power transmission belt is increased due to influence of the rotation fluctuation, thereby causing a problem of early wear and noise generation. Further, since a rubber containing halogen such as the chloroprene rubber leads to generation of dioxin, a belt made from a rubber free from halogen which is an environmental load substance has been in demand recently.

In relation to such demand, ethylene•α-olefin rubbers such as an ethylene-propylene rubber (EPM) and an ethylene-propylene-diene copolymer rubber (EPDM) have recently been noted as promising rubbers since they have excellent heat resistance, are relatively cheap polymers, and satisfy the demand of dehalogenation. Specifically, a friction transmission belt for power transmission, which uses an ethylene•α-elastomer reinforced by a metal salt of an α-β-unsaturated organic acid has been proposed (see, for example, Reference 1).

Also, there has been raised a problem of noise of belt which is caused by an increase in belt approach angle due to low fuel consumption and space-saving of engine. Particularly, a belt friction coefficient is largely changed due to use conditions such as a dry state, a wet state, and a pulley coating type to cause the noise.

As a countermeasure against the noise, a friction transmission belt obtainable by adding various additives of low friction properties to a rubber composition forming a friction transmission surface and capable of suppressing the noise generation has been proposed. For example, Reference 2 proposes a friction transmission belt obtainable by adding an oil to a belt made from a polyurethane elastomer.

[Reference 1] JP-A-9-500930
[Reference 2] JP-A-11-264447

However, since the ethylene•α-olefin elastomer is poor in wettability with water and easily repels water as compared to the chloroprene rubber, a water intrusion state between a belt and a pulley in the wet state is not uniform. A friction coefficient is not reduced and the belt is brought into tight contact with the pulley at a portion which is not intruded with water, while a friction coefficient is partially reduced to cause slipping between the belt and the pulley at a portion intruded with water, thereby raising a problem of being subject to stick-slip noise. However, in the case of rearward running, since the ethylene•α-olefin elastomer is inferior in wettability to the chloroprene rubber, a problem that transmission performance is deteriorated or that a noise is generated by slipping when rain or mad water intrudes (in the wet state) into the pulley section has been raised.

Also, in the case of adding the low friction coefficient substances to a rubber composition, the belt friction coefficient is changed depending on the use conditions such as the dry state, the wet state, and the pulley coating type, thereby raising a problem of failing to achieve stable noise prevention.

SUMMARY OF THE INVENTION

An object of the invention is to provide a highly durable friction transmission belt excellent in power transmission properties and silence in a wet state.

The present inventors have made eager investigation to examine the problem. As a result, it has been found that the foregoing objects can be achieved by the following friction transmission belts. With this finding, the present invention is accomplished.

The present invention is mainly directed to the following items:

1. A friction transmission belt having a friction transmission surface comprising a rubber composition containing a plasticizer, the plasticizer forming a film on the friction transmission surface, a change in friction coefficient ($\mu$) with respect to a change in slipping velocity (V) indicated by a difference between a pulley speed and a belt speed ($d\mu/dv$) being 0 or a positive value in a dry state and a wet state.

2. The friction transmission belt according to item 1, wherein the change in friction coefficient with respect to a change in slipping velocity ($d\mu/dv$) is 0 or a positive value in the dry state and the wet state upon the slipping velocity is 0.3 m/s or more.

3. The friction transmission belt according to item 2, wherein the plasticizer is exuded on the friction transmission surface in the dry state.

4. The friction transmission belt according to item 3, wherein the plasticizer has a solubility power larger than that of a rubber component of the rubber composition to have a different polarity from that of the rubber component.

5. The friction transmission belt according to item 3, wherein the plasticizer has an affinity to water to form a water film on an overall surface of the film of the plasticizer on the friction transmission surface upon the friction transmission belt is in the wet state.

6. The friction transmission belt according to item 2, wherein a friction coefficient ($\mu$) of the friction transmission surface with respect to a pulley is 0.6 or less upon the slipping velocity (V) is 1.0 m/s or less.

7. The friction transmission belt according to item 2, wherein the rubber composition containing: an ethylene•α-olefin elastomer as a rubber component; and the plasticizer of 10 to 25 parts by weight, and an inorganic filler of 60 to 110 parts by weight, with respect to 100 parts by weight of the ethylene•α-olefin elastomer, the plasticizer has a solubility power of 8.3 to 10.7 $(cal/cm^3)^{1/2}$ and is exuded on the friction transmission surface to form the film, the plasticizer has a molecular structure having a hydrophilic group having an affinity to water to form a water film on an overall surface of the film of the plasticizer exuded on the friction transmission surface upon the friction transmission belt is in the wet state.

8. The friction transmission belt according to item 7, wherein the inorganic filler is a carbon black.

9. The friction transmission belt according to item 7, wherein the inorganic filler contains: a carbon black; and at least one of a metal carbonate and a metal silicate.

10. The friction transmission belt according to item 7, wherein the friction transmission belt is a V-ribbed belt.

11. The friction transmission belt according to item 4, wherein: the plasticizer has an affinity to water to form a water film on an overall surface of the film of the plasticizer on the friction transmission surface upon the friction transmission belt is in the wet state; a friction coefficient ($\mu$) of the friction transmission surface with respect to a pulley is 0.6 or less upon the slipping velocity (V) is 1.0 m/s or less; the rubber composition containing: an ethylene•α-olefin elastomer as a rubber component; and the plasticizer of 10 to 25 parts by weight, and an inorganic filler of 60 to 110 parts by weight, with respect to 100 parts by weight of the ethylene•α-olefin elastomer, wherein the inorganic filler contains: a carbon black; and at least one of a metal carbonate and a metal silicate; the plasticizer has a solubility power of 8.3 to 10.7 $(cal/cm^3)^{1/2}$ and is exuded on the friction transmission surface to form the film; the plasticizer has a molecular structure having a hydrophilic group having an affinity to water to form a water film on an overall surface of the film of the plasticizer exuded on the friction transmission surface upon the friction transmission belt is in the wet state; and the friction transmission belt is a V-ribbed belt.

According to the above invention of the item 1, since the film of the plasticizer is formed on the friction transmission surface, a friction between the friction transmission surface and the pulley is mediated by the fluid film. Accordingly, when the change in friction coefficient $\mu$ with respect to the change in slipping velocity V indicated by the difference between the pulley speed and the belt speed ($d\mu/dv$) becomes 0 or a positive value in the dry state and the wet state, motion between the pulley and the friction transmission surface becomes stable to suppress self-excited oscillation. Therefore, the stable state is maintained to prevent the noise generation even when use conditions such as a pulley coating type is changed in the wet state.

According to the above invention of the item 2, since the film of the plasticizer is formed on the friction transmission surface, the friction between the friction transmission surface and the pulley is mediated by the fluid film, so that the motion between the pulley and the friction transmission surface is in the stable state when the change of the friction coefficient $\mu$ with respect to the slipping velocity in the case where the slipping velocity V indicated by the difference between the pulley speed and the belt speed ($d\mu/dv$) is 0.3 m/s or more is 0 or a positive value in the dry and the wet states, thereby suppressing the self-excited oscillation. Therefore, in the wet state, even with a change in use conditions such as the pulley coating type, the stable state is maintained and the noise generation is prevented.

According to the above invention of the item 3, since the plasticizer is exuded (bleeds) on the friction transmission surface, it is possible to form the film of the plasticizer on the friction transmission surface in the dry state.

According to the above invention of the item 4, since the solubility power of the plasticizer is larger than that of the rubber composition, the plasticizer becomes the nonpolar plasticizer to be hardly soluble to the rubber composition having a polarity and is exuded on the friction transmission surface. The solubility power of the plasticizer is preferably larger than that of the rubber composition by 3.0 or more.

According to the above invention of the item 5, since the plasticizer has the affinity to water, the uniform water film is formed on the surface of the film formed on the friction transmission surface in the wet state. Therefore, the stable state of the motion between the pulley and the friction transmission surface is maintained in the wet state.

According to the above invention of the item 6, since the film of the plasticizer is formed on the friction transmission surface, the fluid film mediates the friction between the friction transmission belt and the pulley, thereby settling the friction coefficient $\mu$ of the friction transmission surface with respect to the pulley to 0.6 or less, which is a low friction coefficient, when the slipping velocity is 1.0 m/s or less.

According to the above invention of the item 7, it is possible to improve the wettability of the friction transmission surface by forming the friction transmission surface from the rubber composition containing 10 to 25 parts by weight of the plasticizer having the solubility power of 8.3 to 10.7 $(cal/cm^3)^{1/2}$, thereby achieving improvements in adhesiveness of the belt to the pulley and silence. By adding 60 to 110 parts by weight of the inorganic filler to the rubber composition, the bleeding of the plasticizer is appropriately promoted to cause the plasticizer to act as a lubricant, thereby improving noise suppression during running. Also, since the plasticizer has the hydrophilic group having the affinity to water, the uniform water film is formed on the plasticizer (lubricant) bled on the friction transmission surface in the wet state to improve the noise suppression during running in the wet state. Further, it is possible to suppress the crack on the friction transmission surface and to improve durability of the belt. Furthermore, since the ethylene•α-olefin rubber does not contain halogen, it does not impose burden on the environment.

According to the above invention of the item 8, since the inorganic filler is the carbon black, effects of ensuring great strength and good wear resistance are achieved.

According to the above invention of the item 9, since the inorganic filler contains the carbon black, the metal carbonate and/or the metal silicate, effects of maintaining great strength and good wear resistance and suppressing the noise generation due to oscillation are achieved.

According to the above invention of the item 10, it is possible to obtain the V-ribbed belt enabling excellent transmission and noise suppression properties in the wet state. It is possible to suppress crack on the ribs serving as the friction transmission surface, thereby improving the belt durability.

It is possible to mount the friction transmission belt according to the present invention to an automobile or a driving device for general industrial use.

The reference numerals used in the drawings denote the followings, respectively.

1: V-ribbed belt (friction transmission belt)
2: tension member
3: adhesive layer
4: compression layer
5: stretching layer
6: rib portion

DETAILED DESCRIPTION OF THE INVENTION

Several embodiments of the invention will be described. This embodiment is an application of the invention to a V-ribbed belt serving as a friction transmission belt and having a plurality of rib portions extending in a longitudinal direction of the belt.

Figure 1:
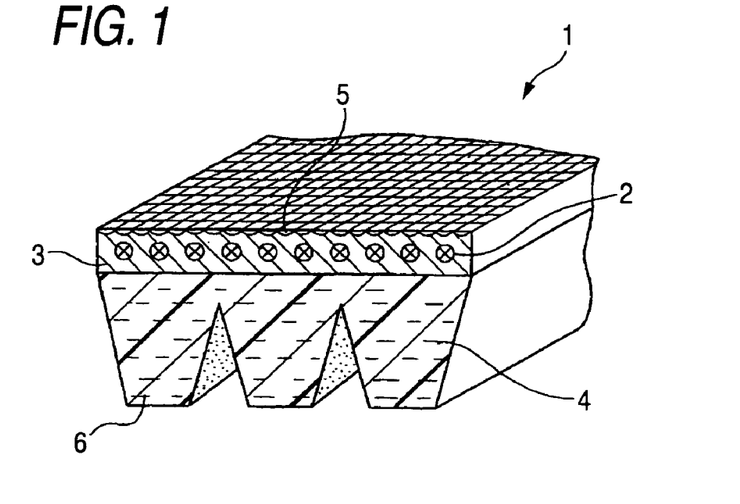
FIG. 1 is a sectional perspective view showing a V-ribbed belt which is a friction transmission belt according to the invention.

As shown in FIG. 1, the V-ribbed belt 1 has an adhesive layer 3 in which a tension member 2 is embedded along the belt longitudinal direction, a compression layer disposed on one side of the adhesive layer 3, and a stretching layer 5 made from a covering canvas for covering the other side of the adhesive layer 3. The compression layer 4 is provided with a plurality of rib portions 6 each extending in the belt longitudinal direction and having a substantially triangle sectional shape. As used herein a friction transmission surface is a surface layer of the compression layer 4.

As the tension member 2 used in the invention, a twisted cord formed from a polyethylene telephthalate (PET) fiber, a polyethylene naphthalate (PEN) fiber, a polytrimethylene telephthalate (PTT) fiber, a polybutylene telephthalate (PBT) fiber, a polyparaphenylene benzobisoxazole (PBO) fiber, a polyamide rubber, a glass fiber, an aramid fiber, or the like may be used.

It is desirable to perform adhesion processing on the tension member, e.g., the tension member may be subjected to processing of (1) dipping an untreated cord in a tank containing a treatment liquid selected from an epoxy compound and an isocyanate compound for pre-dipping, (2) drying by passing the cord through a drying furnace set to a temperature of 160 to 200° C. for 30 to 600 seconds, (3) dipping the cord into a tank containing an adhesive liquid made from an RFL liquid, and (4) passing the cord through an drawing and heat fixing unit set to a temperature of 210 to 260° C. for 30 to 600 seconds, followed by 1% to 3% drawing to obtain a drawn cord.

Examples of the isocyanate compound used in the pretreatment liquid include 4,4'-diphenylmethane diisocyanate, tolylene-2,4-diisocyanate, polymethylene polyphenyl isocyanate, hexamethylene diisocyanate, polyaryl polyisocyanate (for example, PAPI as a commercial product), and the like. The isocyanate compound is mixed with an organic solvent such as toluene and methylethylketone for use.

Also, it is possible to use a blocked polyisocyanate obtainable by blocking an isocyanate group of polyisocyanate through a reaction between the isocyanate compound and a blocking agent such as phenols, tertiary alcohols, and secondary alcohols.

Examples of the epoxy compound include polyvalent alcohols such as ethylene glycol, glycerin, pentaerythritol; reaction products of polyalkylene glycol such as polyethylene glycol and a halogen-containing epoxy compound such as epichlorhydrin; reaction products of polyvalent phenols such as resorcin, bis(4-hydroxydiphenyl)dimethylmethane, a phenol-formaldehyde resin, and a resorcin-formaldehyde resin and a halogen-containing epoxy compound; and the like. The epoxy compound is mixed with an organic solvent such as toluene and methylethylketone for use.

The RFL treatment liquid is obtainable by mixing an initially condensed substance of resorcin and formaldehyde with a rubber latex, and it is preferable to adjust a molar ratio between resorcin and formaldehyde to 1:2 to 2:1 in order to improve an adhesive property. A three dimension reaction of the resorcin-formaldehyde resin proceeds excessively to result in gelation when the molar ratio is less than 1/2, while the reaction between resorcin and formaldehyde does not proceed satisfactorily to result in reduction of adhesive property when the molar ratio exceeds 2/1.

Examples of the rubber latex include a styrene-butadiene-vinylpyridine tertiary copolymer, a hydrogenated nitrile rubber, a chloroprene rubber, a nitrile rubber, and the like.

A mass ratio in solid content between the resorcin-formaldehyde initially condensed substance and the rubber latex may preferably be from 1:2 to 1:8, and it is preferable to maintain this range in order to improve the adhesive property. A resorcin-formaldehyde resin content is increased to harden an RFL coating resulting in deteriorated dynamic adhesion when the ratio is less than 1/2, while the resorcin-formaldehyde resin content is reduced to soften the RFL coating resulting in reduction of adhesive property when the ratio exceeds 1/8.

Further, a vulcanization promoting agent or a vulcanization agent may be added to the RFL liquid, and the vulcanization promoting agent is a sulfur-containing vulcanization promoting agent. Specific examples of the sulfur-containing vulcanization promoting agent include 2-mercapto benzo thiazole (M) and salts thereof (for example, a zinc salt, a sodium salt, a cyclohexylamine salt, and the like); thiazoles such as dibenzothiazyldisulfide (DM); sulfenamides such as N-cyclohexyl-2-benzothiazylsulfenamide (CZ); thiurams such as tetramethyl thiuram monosulfide (TS), tetramethyl thiuram disulfide (TT), and dipentamethylene thiuram tetrasulfide (TRA); dithiocarbamic acid salts such as sodium di-n-butyldithiocarbamate (TP), zinc dimethyldithiocarbamate (PZ), zinc diethyldimethyldithiocarbamate; and the like.

Examples of the vulcanization agent include sulfur, a metal oxide (zinc oxide, magnesium oxide, and lead oxide), an organic peroxide, and the like, and the vulcanization agent is used in combination with the vulcanization promoting agent.

The canvas forming the stretching layer 5 is a fiber base material selected from a woven material, a knitted material, a non-woven cloth, and the like. As a fiber material for forming the canvas, a known material may be used, and examples thereof include a natural fiber such as linen; an inorganic fiber such as a metal fiber and a glass fiber; an organic fiber such as polyamide, polyester, polyethylene, polyurethane, polystyrene, polyflorethylene, polyacryl, polyvinyl alcohol, wholly aromatic polyester, and aramid. In the case of the woven material, the woven material is manufactured by flat weaving, diagonal weaving, or satin weaving a thread made from the above fiber material.

It is preferable to dip the canvas into the RFL liquid in accordance with a known technology. Also, a friction for rubbing a non-vulcanized rubber into the canvas or a dipping of the canvas into a soaking liquid obtained by dissolving a rubber into a solvent may be performed after the dipping into RFL liquid. The treated cloth may be tinted black by mixing a carbon black liquid with the RFL liquid or a known surface active agent may be added in an amount of from 0.1 to 5.0 mass %.

The compression layer 4 is formed from a rubber composition obtained by mixing 10 to 25 parts by weight of a plasticizer having a solubility power of from 8.3 to 10.7 $(cal/cm^3)^{1/2}$ and 60 to 110 parts by weight of an inorganic filler with 100 parts by weight of an ethylene•α-olefin elastomer.

Examples of the ethylene•α-olefin elastomer include a copolymer of ethylene and α-olefin (propylene, butyne, hexen, or octine) or a copolymer of ethylene, the above-listed α-olefin, and a non-conjugated diene, and specific examples thereof include rubbers such as EPM and EPDM. Examples of the diene component include a non-conjugate diene having 5 to 15 carbon atoms, such as ethylidene norbornene, dicyclopentadiene, 1,4-hexadiene, cyclooctadiene, and methylene norbornene.

As the plasticizer, those having a solubility power (SP value) larger than that of the ethylene•α-olefin elastomer (about 8.0 $(cal/cm^3)^{1/2}$), i.e. those having the solubility power ranging from 8.3 to 10.5 $(cal/cm^3)^{1/2}$, is used. By mixing the plasticizer having the SP value larger than that of the ethylene•α-olefin elastomer, it is possible to cause bleeding on a rubber surface to reduce the friction coefficient in an ordinary state (dry state) and to stabilize the friction coefficient in the wet state by ensuring a uniform wettability, thereby suppressing the stick slip phenomenon by acting as a lubricant. The SP value is determined by SP=dΣG/M (d: density, G: molecule attraction constant, M: molecular weight).

As the plasticizer having the solubility power in the range of 8.3 to 10.7 $(cal/cm^3)^{1/2}$, a plasticizer of ether-based, ester-based, ether ester-based, phthalic acid derivative-based, adipic acid derivative-based, a sebacic acid derivative-based, trimellitic acid derivative-based, and phosphoric acid derivative-based may be used, for example. Among the above, it is preferable to use tricresyl phosphate (SP value: 8.4), dioctyl sepacate (SP value: 8.5), triphenyl phosphate (SP value: 8.5), dioctyl adipate (SP value: 8.7), dibutyl phthalate (SP value: 9.3 to 10.7), and the ether ester-based plasticizer (SP value: 8.3 to 9.2).

Besides, a plasticizer having a molecular structure having a hydrophilic group having an affinity to water, such as an OH group, a carboxyl group, and an ether group, is used. Among them, it is preferable to use tricresyl phosphate (modified carboxyl group), dioctyl sepacate (modified carboxyl group), triphenyl phosphate (modified carboxyl group), dioctyl adipate (modified carboxyl group), dibutyl phthalate (modified carboxyl group), and ether ester-based plasticizers (ether group).

A plasticizer having a molecular structure having a hydrophilic group having an affinity to water, such as an OH group, a carboxyl group, and an ether group, is exuded on a friction transmission surface. In the wet state, a water film is formed on an overall surface of a film of the exuded hydrophilic plasticizer.

An amount of the plasticizer to be mixed is from 10 to 25 parts by weight with respect to 100 parts by weight of the ethylene•α-olefin elastomer. That is, when the content is less than 10 parts by weight, the content is insufficient for the plasticizer to cover the belt surface, thereby making it difficult to ensure the uniform wettability and resulting in insufficient lubricant effect. On the other hand, when the content exceeds 25 parts by weight, defects such as a remarkable reduction in surface friction coefficient and a remarkable deterioration in wear resistance occur. In view of prevention of evaporation under a high temperature environment, an average molecular weight of the plasticizer may preferably be 300 or more.

Examples of the inorganic filler include carbon black, a metal carbonate, a metal silicate, and the like. In view of a reinforcing property, it is desirable to contain at least the carbon black.

As the carbon black, it is preferable to use those having characteristics of a nitrogen absorption specific surface area of 20 to 150 $cm^2/g$ and a DBP oil absorption of 50 to 160 $cm^3/100$ g without limitation thereto. As used herein, the nitrogen absorption specific surface area (N. SA) means a specific surface area of the carbon black and is measured in accordance with JIS K6217-2. The DBP oil absorption (dibutyl phthalate oil absorption) means an index for a structure and is measured in accordance with JIS K6217-4.

Examples of the metal carbonate include calcium hydroxide, and examples of the metal silicate include calcium silicate, potassium aluminum silicate, aluminum silicate, magnesium silicate, and the like. Specifically, examples of the aluminum silicate include clay and the like; examples of the magnesium silicate include talc and the like; and examples of the potassium aluminum silicate include mica and the like. These metal carbonates and metal silicates may be used alone or in combination. Among the above, calcium hydroxide is desirable since it has a good compatibility with rubbers and does not adversely influence on mechanical properties such as strength.

An average primary particle diameter of the inorganic filler may preferably be from 0.01 to 3.00 μm. Defects such as adverse influence on durability of the belt are caused when the average primary particle diameter exceeds 3.00 μm, while dispersibility is deteriorated to result in irregular rubber physical properties when the average primary particle diameter is less than 0.01 μm.

A content of the inorganic filler is from 60 to 110 parts by weight with respect to 100 parts by weight of the ethylene•α-olefin elastomer. An effect of bleeding the plasticizer is insufficient when the content is less than 60 parts by weight. On the other hand, when the content exceeds 110 parts by weight, defects such as a reduction in flexion resistance are caused.

An organic peroxide may be mixed with the rubber composition as a crosslinking agent. Examples of the organic peroxide include, for example, dicumyl peroxide, di-t-butyl peroxide, t-butyl-gumyl peroxide, benzoyl peroxide, 1,3-bis (t-butyl peroxiisopropyl)benzene-2,5-dimethyl-2,5-di(t-butylperoxi)hexine-3,2,5-dimethyl-2,5-(benzoylperoxi)hexane, 2,5-dimethyl-2,5-mono(t-butylperoxi)hexane, and the like. These organic peroxides may preferably be used alone or as a mixed substance in an amount ranging from 0.5 to 8 parts by weight with respect to 100 parts by weight of the polymer component.

The rubber composition may contain from 0.5 to 13 parts by weight of N,N'-m-phenylene dimaleimide and/or quinonedioxims with respect to 100 parts by weight of the polymer component. The N,N'-m-phenylene dimaleimide and/or the quinonedioxims act as a crosslinking agent, and the effect is not prominent when the added amount is less than 0.5 parts by weight, while a tearing power and an adhesive power are rapidly deteriorated when the added amount exceeds 13 parts by weight. In the case where the N,N'-m-phenylene dimaleimide is selected as the crosslinking agent, characteristics such as improvements in crosslinking density and wear resistance and a reduction in difference in transmission performance between the wet state and the dry state are achieved. Also, in the case where the quinonedioxims are selected, characteristics such as excellence in adhesion with the fiber base material is achieved.

Examples of the quinonedioxims include p-benzoquinone dioxim, p,p'-dibenzoquinone dioxim, tetrachlorobenzoquinone poly(P-dinitrobenzoquinone), and the like. In view of the adhesiveness and the crosslinking density, benzoquinone dioxims such as p-benzoquinone dioxim and p,p'-benzoquinone dioxim are preferred.

Other than the above, those used for ordinary rubber mixtures, such as a short fiber, an anti-aging agent, a stabilizing agent, a processing auxiliary agent, and a coloring agent, are used when so required. A method for mixing the components to the rubber composition is not particularly limited, and, for example, it is possible to knead by using known means such as a banbury mixer and a kneader and a known method.

It is desirable to use an ethylene•α-olefin rubber alone or a blended rubber obtained by mixing a counter rubber made from various rubbers as a rubber component for the adhesive layer 3. Examples of the counter rubber to be blended with the ethylene•α-olefin rubber include at least one of a butadiene rubber (BR), a styrene-butadiene rubber (SBR), a nitrile rubber (NBR), a hydrogenated nitrile rubber (H-NBR), a chloroprene rubber (CR), a butyl rubber (IIR), and a natural rubber. Of course, it is possible to use the rubber composition same as that described above.

Figure 4:
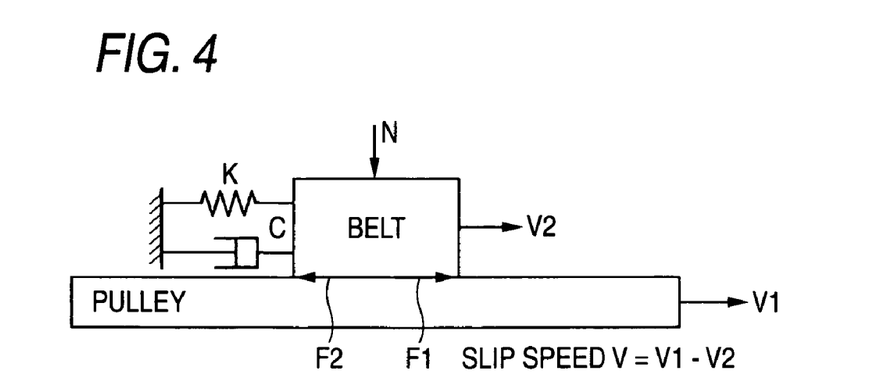
FIG. 4 is a diagram showing a model of friction between a belt and a pulley.

Hereinafter, wear characteristics of the friction transmission surface by the above-described rubber component will be described. Shown in FIG. 4 is a result of modeling a state of friction between the pulley and the friction transmission surface.

A simulation motion equation in this model is as represented by the following Equation (1).

$$m \cdot \ddot{x} + \left(C + N \frac{dM}{dV}\right) \cdot \dot{x} + K \cdot x = N \cdot \mu(V) \quad (1)$$

In Equation (1), when $(C+N(d\mu/dV))<0$ is true, an unstable state is caused. That is, in FIG. 4, since an acting force F1 on the friction surface is oriented to a running direction of the belt and the pulley, the unstable state occurs to induce self-excited oscillation, thereby generating a noise.

By contraries, when $(C+N(d\mu/dV))>0$ is true in Equation (1), a stable state is established. That is, in FIG. 4, since an acting force F2 on the friction surface is oriented to a direction reverse to the running direction of the belt and the pulley, the stable state is established, so that the self-excited oscillation and the noise do not occur.

It has been found that the stable state is established by setting $d\mu/dV$ (a change in friction coefficient μ with respect to a change in slipping velocity V indicated by a difference between a pulley speed and a belt speed) to $\geq 0$ when C>0 and N>0. Also, though the noise hardly occurs when $d\mu/dV$ is set to $\geq 0$, it has been found that it is realistic to maintain a low μ with respect to the slipping velocity V since it is difficult to maintain a high μ with respect to V.

Accordingly, slipping characteristics similar to those of fluid lubrication are achieved by: using the above-described rubber composition; forming a film of the plasticizer on the friction transmission surface in the dry state; and mediating the friction between the friction transmission surface and the pulley by the use of the fluid film of the plasticizer. Therefore, in order to form the uniform fluid film of the plasticizer on the friction transmission surface in the dry state, the above-described specific plasticizer is used. The friction characteristics achieved by the fluid film are similar to those of the fluid lubrication, and, though μ of the overall belt is 0.6 or less which is relatively low, μ is not reduced even when the slipping velocity is increased, so that $d\mu/dV \geq 0$ is constantly maintained. Thus, the stable state is established to suppress the noise generation.

In the case where the V-ribbed belt is wet, water is present between the V-ribbed belt and the friction transmission surface. Since the plasticizer exuded on the front face of the friction transmission surface has an affinity to water, a uniform water film is formed on the overall front face of the friction transmission surface. Thus, since a uniform fluid film formed of the plasticizer and the water film is formed on the friction transmission surface, μ which is originally low does not change largely or is not changed when the slipping velocity is increased, so that $d\mu/dV \geq 0$ is constantly maintained. Thus, the stable state is established and the noise generation is suppressed. That is, even under the change in condition of from the dry state to the wet state, the stable state is maintained and the noise generation is suppressed.

Though the case of wet state in which the water is present is described above, even when μ changes due to a change of coating type of the pulley, μ which is originally low does not change largely, and the stable state and the suppression of noise generation are achieved.

As used herein, the wet state means, in a V-ribbed belt for an automobile, a state wherein a surface of the friction transmission surface of the V-ribbed belt is wetted with water or water droplets are formed on the surface, such as in the case of washing or traveling on water-covered road. When a slight amount of water is present non-uniformly on the friction transmission surface of the V-ribbed belt, the friction stable state is impaired. Therefore, the friction transmission surface of the V-ribbed belt is so formed as to uniformly spread the slightest amount of water and as to prevent the water to spread non-uniformly.

The structure of the V-ribbed belt is not limited to that shown in FIG. 1, and a V-ribbed belt without the adhesive layer, a V-ribbed belt of which the rubber is exposed without the canvas adhered at its rear face, and the like belong to the technical scope of the invention. Hereinafter, embodiments of such belts will be described based on the drawings.

Figure 2:
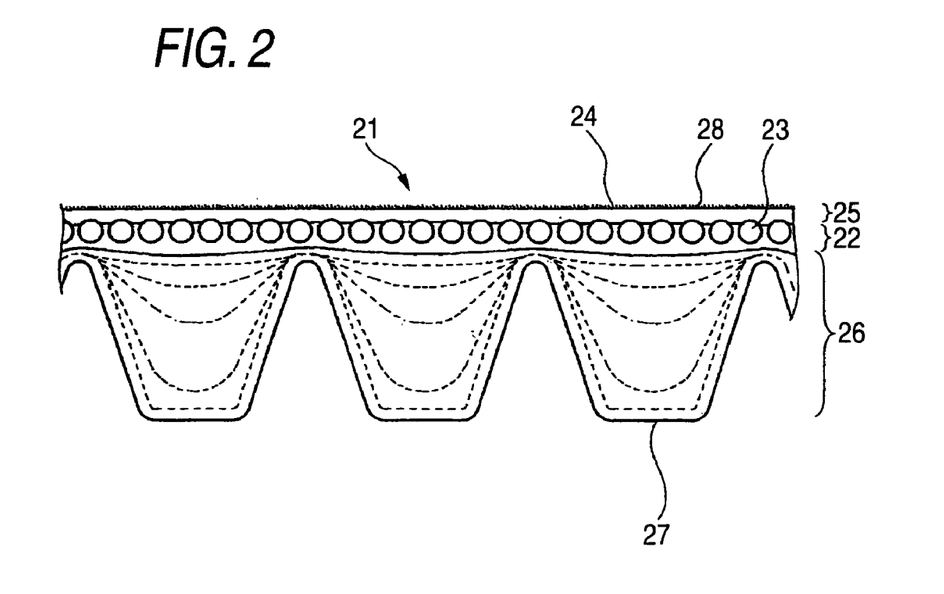
FIG. 2 is a sectional perspective view showing another V-ribbed belt which is a friction transmission belt according to the invention.

A V-ribbed belt 21 shown in FIG. 2 has a stretching layer 25 provided with a rear face 28 formed from a rubber composition and having a hair-filled layer 24, an adhesive layer 22 disposed under the stretching layer 25, and a compression layer 26 disposed under the adhesive layer 22. A tension member 23 is embedded in a main body along a belt longitudinal direction, and a part thereof contacts the stretching layer 25 with the rest contacting the adhesive layer 22. The compression layer 26 is provided with a plurality of ribs 27 each extending in the belt longitudinal direction and having a substantially triangle sectional shape. A short fiber contained in the compression layer 26 produces a fluid state along the rib shape and a short fiber near a front face is oriented along the rib shape.

Figure 3:
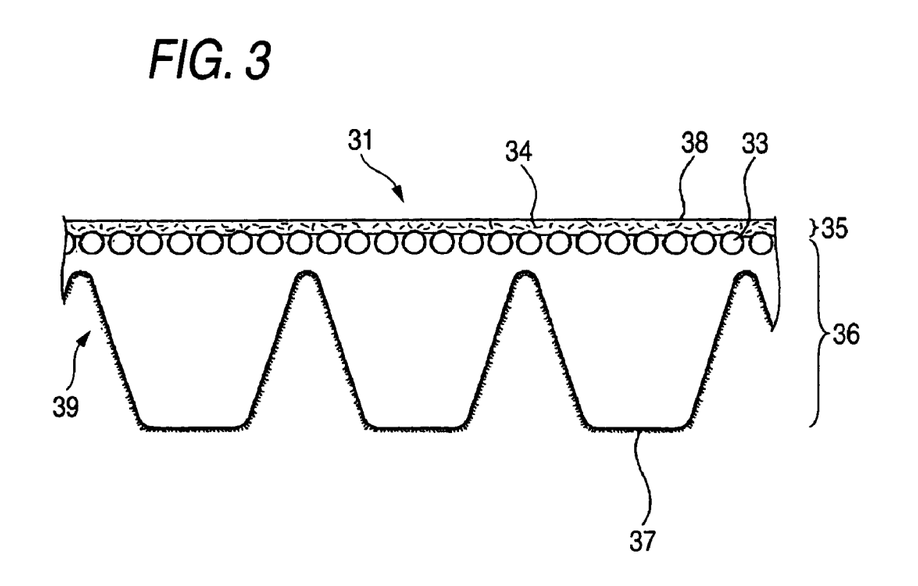
FIG. 3 is a sectional perspective view showing still another V-ribbed belt which is a friction transmission belt according to the invention.

A V-ribbed belt 31 shown in FIG. 3 has a stretching layer 35 provided with a rear face 38 formed from a rubber composition containing a short fiber 34 and a compression layer 36 disposed under the stretching layer 35. A tension member 33 is embedded in a main body along a belt longitudinal direction, and a part thereof contacts the stretching layer 35 with the rest contacting the compression layer 36. The compression layer 36 is provided with a plurality of ribs 37 each extending in the belt longitudinal direction and having a substantially triangle sectional shape, and a hair-filled layer 39 is provided on a surface of each of the ribs. A short fiber contained in the stretching layer 25 is oriented to random directions.

Shown in FIG. 3 is the structure in which the stretching layer 35 is not formed from the canvas but from the rubber composition containing the short fiber, and an irregular pattern may be formed on the rear surface in order to suppress the noise during rear face driving. Examples of the irregular pattern include a knitted cloth pattern, a woven cloth pattern, a cord fabric pattern, and the like, and the most preferable pattern is the woven pattern. As the short fiber, polyester, aramid, nylon, cotton, or the like may be blended as required. The rubber composition, the tension member, and the like forming the stretching layer, the compression layer, and the adhesive layer may be the same as those described in the foregoing.

Though the short fiber contained in the stretching layer 35 of FIG. 3 is oriented to the random directions, the short fiber can be oriented to one direction such as a belt width direction. In the case where the fiber is oriented to the random directions, it is possible to suppress generations of tearing and crack from various directions. When a short fiber (middle fiber, for example) having a bent portion is used as the short fiber, it is possible to realize a resistance to forces acting from more various directions.

In the case of the constitution where no adhesive layer is provided as shown in FIG. 3, the tension member 33 is embedded in a boundary region between the stretching layer 35 and the compression layer 36 in the belt main body. In view of adhesion of the tension member 33 to the belt main body, it is desirable to form either one of the rubber layers (the stretching layer 35 or the compression layer 36) from a rubber composition that does not contain the short fiber.

Though the stretching layer 25 in FIG. 2 has the hair-filled layer 24 provided on the surface of the rubber composition containing no short fiber, a structure wherein a hair-filled layer is provided on a surface of a rubber composition containing a short fiber may be adopted.

Though the short fiber contained in the compression layer 26 in FIG. 2 produces the fluid state along the rib shape, the short fiber may be oriented to the width direction.

In the case where the V-ribbed belt performs a rear face transmission, a surface of the stretching layer may serve as the friction transmission surface. Accordingly, the stretching layer may be formed from the rubber composition of the invention.

Hereinafter, a production method of these V-ribbed belts will be described. Examples of the production method include, but not limited to, the following methods.

As a first method, a member forming a stretching layer and an adhesive rubber sheet forming an adhesive layer are wound around a periphery of a cylindrical molding drum, followed by spinning a tension member made from a cord in a helical form, and then a compression rubber sheet forming a compression layer is wound to obtain a non-vulcanized sleeve. The non-vulcanized sleeve is vulcanized to obtain a vulcanized sleeve. Then, the vulcanized sleeve is hung on a driving roller and a driven roller and caused to run at a tension lower than a predetermined tension, and a rotated polishing wheel is moved in such a fashion as to contact the running vulcanized sleeve to polish 3 to 100 groove portions on a surface of the compression layer of the sleeve, thereby forming a friction transmission surface. The thus-obtained sleeve is removed from the driving roller and the driven roller to hang the sleeve on another driving roller and another driven roller, whereby the sleeve is caused to run and cut into pieces each having a predetermined width by a cutter, thereby obtaining V-ribbed belts.

As a second method, a compression rubber sheet forming a compression layer and an adhesive rubber sheet forming an adhesive layer are wound around a cylindrical molding drum provided with rib engraved marks on its periphery followed by spinning a tension member, and then a member forming a stretching layer is wound to dispose a non-vulcanized sleeve. After that, the non-vulcanized sleeve is vulcanized simultaneously with being pressed against the molding drum to form ribs on the compression layer. The thus-obtained vulcanized sleeve has the ribs, and rib surfaces may be polished when so required. V-ribbed belts are formed by cutting the vulcanized sleeve into pieces each having a predetermined width.

As a third method, a member for forming a stretching layer and an adhesive rubber sheet for forming an adhesive layer are wound on a flexible jacket mounted on a cylindrical molding drum, followed by spinning a tension member on the adhesive layer, and then a compression rubber sheet for forming a compression layer is wound. The layers are wound in an endless fashion to form a non-vulcanized sleeve. Then, the flexible jacket is expanded to press the non-vulcanized sleeve against an outer cavity having engraved marks corresponding to rib portions, thereby achieving vulcanizing molding. The thus-obtained vulcanized sleeve has the ribs of which surfaces may be polished when so required. The vulcanized sleeve is cut into pieces each having a predetermined width to obtain V-ribbed belts.

As a fourth method, a first non-vulcanized sleeve on which a compression rubber sheet for forming a compression layer is formed on a flexible jacket mounted on a cylindrical molding drum, followed by expanding the flexible jacket to press the first non-vulcanized sleeve against an outer cavity having engraved marks corresponding to rib portions, thereby forming a preliminary molded article having the ribs. Then, an inner cavity is detached from the outer cavity with which the preliminary molded article is in close contact, and a member forming a stretching layer and an adhesive rubber sheet for forming an adhesive layer are placed in the inner cavity, followed by spinning a tension member to form a second non-vulcanized sleeve. Then, the flexible jacket is expanded to press the second non-vulcanized sleeve against the outer cavity with which the preliminary molded article is in close contact from an inner periphery direction to integrally vulcanize the second non-vulcanized sleeve and the preliminary molded article. The thus-obtained vulcanized belt sleeve has the ribs, and the ribs may be polished when so required. The vulcanized belt sleeve is cut into pieces each having a predetermined width to obtain V-ribbed belts.

In the case of using a compression layer having two layers (outer layer and inner layer) for the V-ribbed belt, it is necessary to form a non-vulcanized sleeve having the compression layer having the two layer structure of the outer layer and the inner layer by winding a compression rubber sheet having a two layer structure of an outer layer and an inner layer or by winding an outer layer compression rubber sheet and an inner layer compression rubber sheet sequentially. In this case, since the ribs are formed by polishing in the first method, it is considered that the inner layer will be exposed on a rib lateral face or a rib bottom though the outer layer is present on a rib top of the V-ribbed belt. Therefore, it is desirable to form the V-ribbed belt having the two layers of the outer layer and the inner layer by the second, third, or fourth method.

Also, the V-ribbed belt that is not provided with the adhesive layer as shown in FIG. 3 is obtainable by omitting the provision of the adhesive rubber sheet in the above methods. Further, the V-ribbed belt in which the short fiber contained in the compression layer 26 produces the fluid state along the rib shape as shown in FIG. 2 is obtainable by the second, third, or fourth method. It is possible to obtain the V-ribbed belt in which the short fiber contained in the compression layer is oriented to the width direction by the first method, for example.

This embodiment is one example of applying the invention to the V-ribbed belt, and it is possible to apply the invention to other types of friction transmission belts without limitation to the V-ribbed belt.

EXAMPLES

The present invention is now illustrated in greater detail with reference to Examples and Comparative Examples, but it should be understood that the present invention is not to be construed as being limited thereto.

Examples 1 and 2

Comparative Example 1

The V-ribbed belt in each of Examples 1 to 2 and Comparative Example 1 was formed by embedding a tension member formed of a rope made from a polyester fiber and 2-ply-stacking a cotton canvas with rubber on one side of an adhesive rubber layer, followed by disposing three rib portions on a compression rubber layer provided on the other side of the adhesive rubber layer in a belt longitudinal direction.

Each of the compression layers was obtained by adjusting the rubber composition shown in Table 1, kneading by a banbury mixer, and then rolling by a calendar roller. The compression layer contained a short fiber, and the short fiber was oriented to a belt width direction. Each of the adhesive layers was of the rubber content from which the short fiber was excluded from the rubber composition shown in Table 1. Physical properties of crosslinked rubbers obtained by pressing and crosslinking the rubber compositions shown in Table 1 for 30 minutes were evaluated. Results of measurements of hardness (JIS-A) and elongation EB (in a direction of right angle with respect to the orientation of the short fiber) when cut of each of the thus-obtained crosslinked rubbers conducted in accordance with JIS K6253 and JIS K6251 are shown in Table 2.

TABLE 1

|  | Ex. 1 | Ex. 2 | Comp. Ex. 1 |
| --- | --- | --- | --- |
| EPDM *1 | 100 | 100 | 100 |
| Short fiber *2 | 25 | 25 | 25 |
| Zinc oxide *3 | 5 | 5 | 5 |
| Stearic acid | 1 | 1 | 1 |
| MAFI carbon black | 65 | 65 | 65 |
| Calcium carbonate | 35 | 35 | 35 |
| Anti-aging agent | 2 | 2 | 2 |
| Ether-based plasticizer *4 | 15 |  |  |
| Phosphate-based plasticizer *5 |  | 15 |  |
| Paraffin-based oil *6 |  |  | 15 |
| Crosslinking agent *7 | 2 | 2 | 2 |
| Organic peroxide *8 | 8 | 8 | 8 |
| Sulfur | 0.3 | 0.3 | 0.3 |

Notes:
*1 ethylene content: 58%, diene ingredient: ethylidene norbornene
*2 nylon cut thread: 3 mm
*3 zinc flower (product of Seido Kagaku Kogyo Kabushiki Kaisha)
*4 Adeka cizer RS700 (product of Adeka Corporation).), SP value: 8.5 molecular weight: 551
*5 trioctylphosphate (product of Otsuka Chemical Co., Ltd.), SP value: 8.6, molecular weight: 434
*6 diana process oil (paraffin oil, product of Idemitsu Kosan Co., Ltd.), SP value: 7.5
*7 N-N-m-phenylene dimaleimide
*8 1,3-bis(t-butylperoxiisopropyl)benzene 40 w %, calcium carbonate 60 w %

TABLE 2

|  | Ex. 1 | Ex. 2 | Comp. Ex. 1 |
| --- | --- | --- | --- |
| Hardness (JIS-A) | 82 | 82 | 83 |
| CMD EB (%) | 240 | 220 | 200 |

As a production method of the belt, the following known method was employed. To start with, a 2-ply cotton canvas with rubber and an adhesive rubber layer were wound around a flat cylindrical mold, followed by spinning a tension member, and then winding a compression rubber layer, followed by inserting a vulcanizing jacket on the compression rubber layer. Then, the mold was placed into a vulcanizing can to perform vulcanization, followed by taking out the cylindrical vulcanized sleeve from the mold. Then, the compression rubber layer of the vulcanized sleeve was polished by using a grinder to form a plurality of rib portions, followed by cutting into belts using a cutter, thereby obtaining V-ribbed belts.

Then, the following μ-V measurement test and actual machine running test were conducted.

Figure 5:
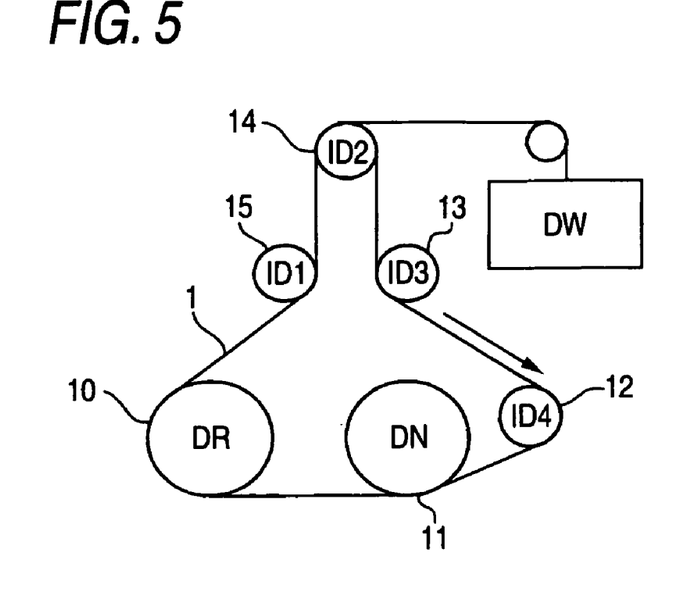
FIG. 5 is a diagram showing a layout of a measurement device according to a $\mu$-v measurement in Examples.

As shown in FIG. 5, a running test machine used for the μ-V measurement had a structure of an SUS driving pulley 10 (diameter: 120 mm; surface roughness Ra: 0.3 μm), a driven pulley 11 (diameter: 110 mm), idler pulleys 12 and 13 (diameter: 77 mm), a tension pulley 14 (diameter: 60 mm), and an idler pulley 15 (diameter: 77 mm), which are disposed sequentially. The V-ribbed belt 1 was hung on the pulleys 10 to 15 of the test machine. The V-ribbed belt 1 was caused to run with a weight being applied on the driving pulley 10 and with a load being applied on the driven pulley 11 under the conditions of: a winding angle of the V-ribbed belt 1 on the tension pulley 14 of 180 degrees; a winding angle of the V-ribbed belt 1 on the idler pulley 12 of 120 degrees; a rotation number of the driving pulley of 0 to 300 rpm; and a belt tension of 80 N/rib. Then, a change in μ with respect to a change in slipping velocity V was measured by the Euler method.

A change in μ with respect to a change in slipping velocity V in the pulley 10 was measured. In this case, a belt speed and a pulley speed were calculated by using a built-in encoder. The belt speed was calculated by the built-in encoder of a rear face idler portion, and a slip rate in the rear face idler portion was calculated to be 0%.

Figure 6:
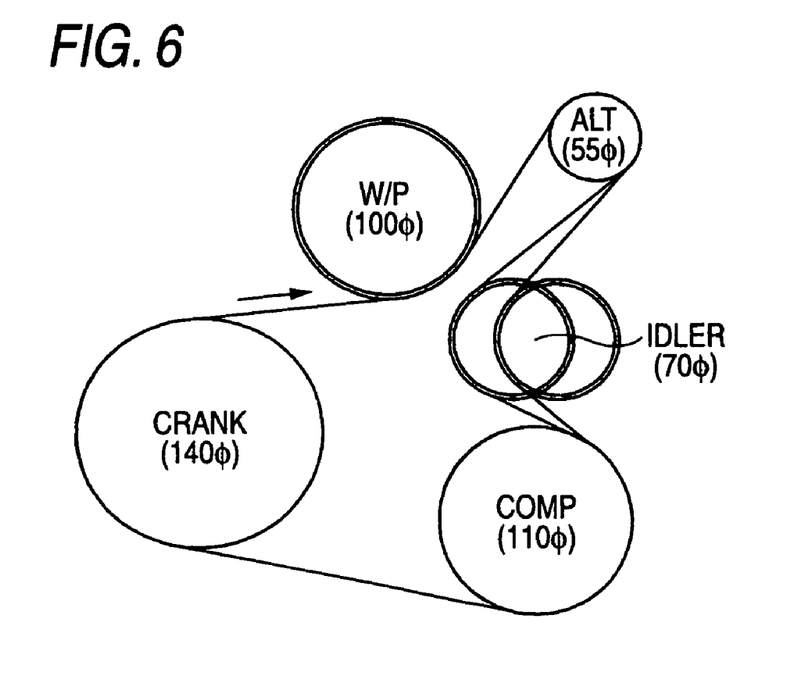
FIG. 6 is a layout of a measurement device according to an actual machine measurement in Examples.

In the actual machine running test, a belt having the size of 7PK1140 was hung in the driving device according to a pulley arrangement shown in FIG. 6, and a belt tension was set to 90 N/rib. A belt speed, a pulley speed, and an oscillation waveform (S/Sig) in a dry state and a wet state (when the whole belt was dipped into water and then pulled out from water) were measured by starting from 0. A surface of a clank pulley was plated with zinc (surface roughness Ra: 1.2 μm), and an engine size was HR15DE.

Results of the μ-V measurement tests and the actual machine running tests are shown in FIGS. 7 to 11.

Figure 7:
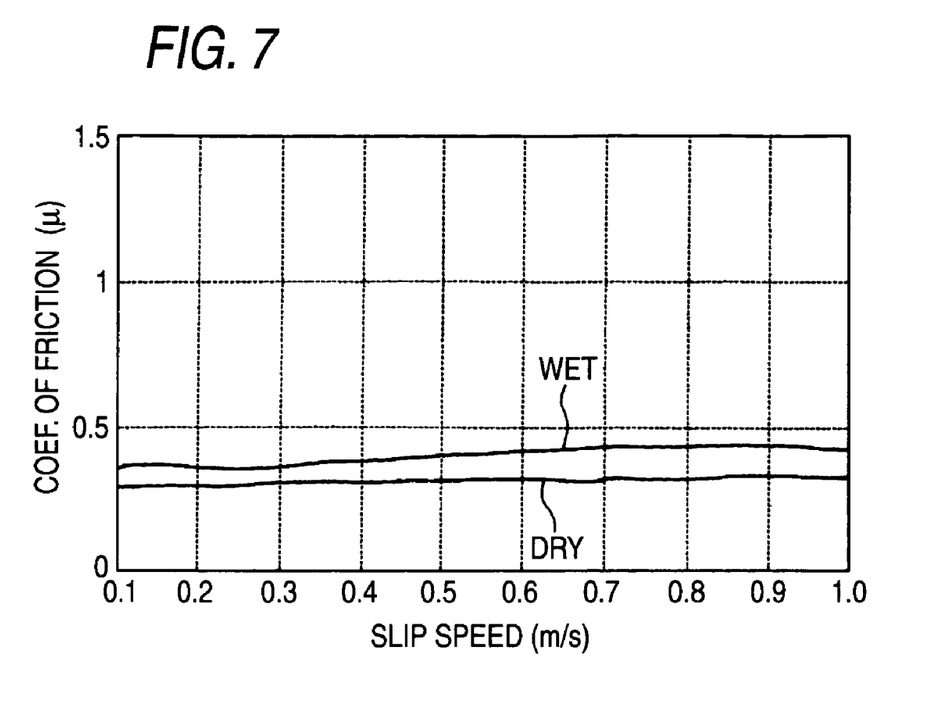
FIG. 7 is a graph showing a $\mu$-v measurement result of Example 1.
Figure 8:
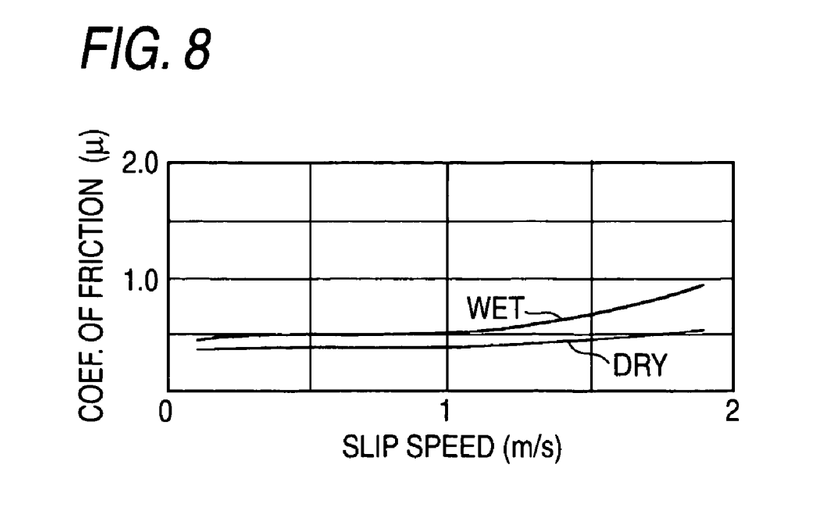
FIG. 8 is a graph showing another $\mu$-v measurement result of Example 1.
Figure 9:
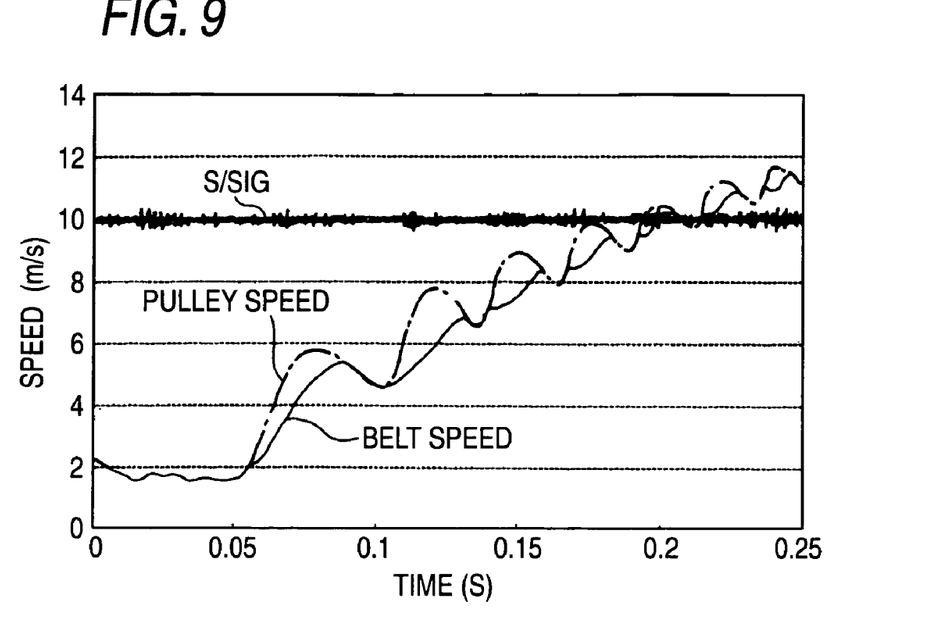
FIG. 9 is a graph showing an actual machine measurement result of Example 1.

Shown in FIGS. 7 and 8 are the result of the μ-V measurement test of Example 1, and shown in FIG. 9 is the result of the actual machine running test of Example 1.

As shown in FIG. 7, the μ-V characteristics of the dry state and the wet state little or nothing differ from each other (the difference therebetween is 0.15 or less), and were 0.6 or less in the range until the slipping velocity became 1.0 m/s. In the wet state, dμ/dv>0 is maintained to show that the μ-V characteristics are almost flat.

Shown in FIG. 8 is a graph showing μ-V characteristics when the belt was dipped into water and the pulled up from the water as the wet state. In FIG. 8, dμ/dV did not become a negative value and dμ/dv≧0 was maintained perfectly and continuously. In the range until the slipping velocity became 1.0 m/s, little or nothing differed between the μ-V characteristics of the dry state and the wet state (the difference therebetween was 0.15 or less), and each of the μ-V characteristics was 0.6 or less.

As shown in actual machine measurement waveform (sound signal [S/Sig]) in FIG. 9, the belt did not cause the self-excited oscillation, and noise was not generated.

Also, in each of FIGS. 7 and 8, when the slipping velocity exceeded 0.3 m/s, dμ/dV became 0 without fail irrelevant from the state (wet or dry).

Figure 10:
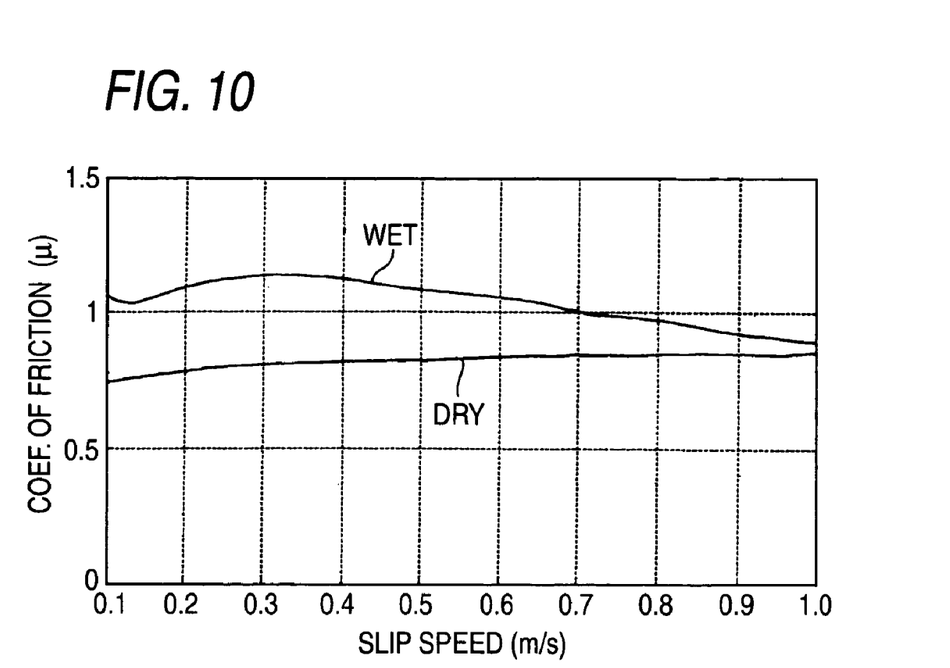
FIG. 10 is a graph showing a μ-v measurement result of Comparative Example 1.
Figure 11:
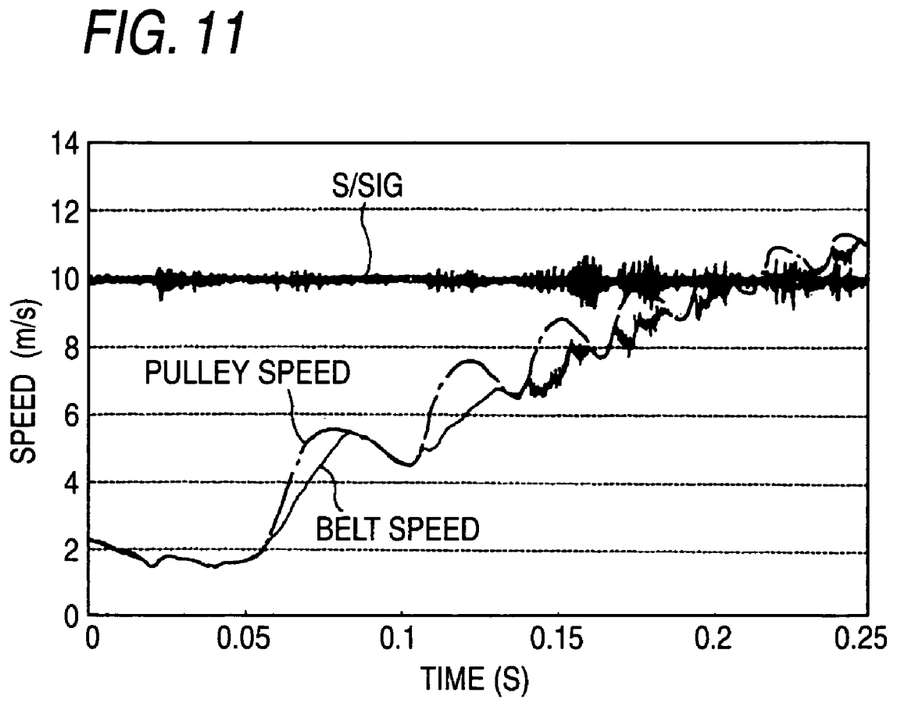
FIG. 11 is a graph showing an actual machine measurement result of Comparative Example 1.

Shown in FIG. 10 is the result of the μ-V measurement test of comparative Example 1, and shown in FIG. 11 is the result of the actual machine running test of Comparative Example 1.

Comparative Example 1 was high in friction coefficient in both of the dry state and the wet state due to the absence of the plasticizer having the large SP value, resulting in the great difference in friction coefficient between the dry state and the wet state. It was determined that, in the wet sate, the friction coefficient was 0.3 m/s or more, and dμ/dV became <0. As shown in the actual machine measurement waveform in FIG. 11, the belt caused the self-excited oscillation to generate noise.

Examples 2 exhibited similar characteristics as those of Example 1 shown in FIGS. 7, 8, and 9.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-286350 filed on Sep. 30, 2005 and No. 2006-167740 filed on Jun. 16, 2006, and the contents thereof are incorporated herein by reference.

What is claimed is:

1. A friction transmission belt, comprising,
a friction transmission surface; and
a film on the friction transmission surface;
the film including a plasticizer with a molecular structure;
the molecular structure of the plasticizer having a hydrophilic group having an affinity to water;
whereby the friction transmission surface has a change in friction coefficient (μ) with respect to a change in slipping velocity (V) indicated by a difference between a pulley speed and a belt speed (dμ/dv) that is 0 or a positive value in a dry state and a wet state, and
wherein the plasticizer has a solubility power larger than that of a rubber component of the rubber composition to have a different polarity from that of the rubber component.

2. The friction transmission belt according to claim 1,
wherein the plasticizer is exuded on the friction transmission surface in the dry state.

3. The friction transmission belt according to claim 1,
wherein a water film is formed on an overall surface of the film of the plasticizer on the friction transmission surface when the friction transmission belt is in the wet state.

4. The friction transmission belt according to claim 1,
wherein the friction coefficient (μ) of the friction transmission surface with respect to a pulley is 0.6 or less when the slipping velocity (V) is 1.0 m/s or less.

5. The friction transmission belt according to claim 1,
wherein the belt of is formed of a rubber composition containing:
an ethylene•α-olefin elastomer as a rubber component; and
the plasticizer of 10 to 25 parts by weight, and an inorganic filler of 60 to 110 parts by weight, with respect to 100 parts by weight of the ethylene•α-olefin elastomer, the plasticizer has a solubility power of 8.3 to 10.7 (cal/cm$^3$)$^{1/2}$ and is exuded on the friction transmission surface to form the film,
whereby a water film is formed on an overall surface of the film of the plasticizer exuded on the friction transmission surface when the friction transmission belt is in the wet state.

6. The friction transmission belt according to claim 1,
the friction coefficient (μ) of the friction transmission surface with respect to a pulley is 0.6 or less upon a slipping velocity (V) is 1.0 m/s or less;
the friction transmission belt is formed of a rubber composition containing:
an ethylene•α-olefin elastomer as the rubber component; and
the plasticizer of 10 to 25 parts by weight, and an inorganic filler of 60 to 110 parts by weight, with respect to 100 parts by weight of the ethylene•α-olefin elastomer, wherein the inorganic filler contains: a carbon black; and at least one of a metal carbonate and a metal silicate;
the plasticizer has a solubility power of 8.3 to 10.7 (cal/cm$^3$)$^{1/2}$ and is exuded on the friction transmission surface to form the film;
whereby a water film is formed on an overall surface of the film of the plasticizer exuded on the friction transmission surface when the friction transmission belt is in the wet state; and
the friction transmission belt is a V-ribbed belt.

7. The friction transmission belt according to claim 1, wherein the plasticizer has a solubility power of 8.3 to 10.7 (cal/cm$^3$)$^{1/2}$.

8. The friction transmission belt according to claim 1, wherein the plasticizer has a solubility power larger than that of the rubber component of the rubber composition by 3.0 or more.

9. The friction transmission belt according to claim 5, wherein the inorganic filler is a carbon black.

10. The friction transmission belt according to claim 5, wherein the inorganic filler contains:
a carbon black; and
at least one of a metal carbonate and a metal silicate.

11. The friction transmission belt according to claim 5, wherein the friction transmission belt is a V-ribbed belt.

12. A method of manufacturing a friction transmission belt, comprising:
selecting a rubber composition, including:
selecting a plasticizer, the plasticizer having a molecular structure having a hydrophilic group having an affinity to water;
fabricating the friction transmission belt using the rubber composition, including:
forming a friction transmission surface, and
exuding the plasticizer to the friction transmission surface of the friction transmission belt to form a film on the friction transmission surface having an affinity to water such that the friction transmission surface provides a friction coefficient that has no change or a positive change with respect to a change in a slipping velocity in a dry state and a wet state wherein the plasticizer has a solubility power larger than that of a rubber component of the rubber composition to have a different polarity from that of the rubber component, wherein the slipping velocity is defined as a difference between a pulley speed and a belt speed.

* * * * *